United States Patent [19]

Wright

[11] 4,432,519
[45] Feb. 21, 1984

[54] MEANS FOR MOUNTING CABLES AND THE LIKE

[75] Inventor: Howard Wright, Brisbane, Australia

[73] Assignee: Burundy, Inc., Ontario, Canada

[21] Appl. No.: 225,264

[22] Filed: Jan. 15, 1981

[30] Foreign Application Priority Data

Jan. 17, 1980 [AU] Australia ............................. PE2041

[51] Int. Cl.³ ............................................... F16L 3/00
[52] U.S. Cl. .................................... 248/49; 174/68 C; 174/72 A; 191/12 C; 248/68 R
[58] Field of Search ............. 248/49, 68 R; 174/68 C, 174/72 A; 191/12 C; 59/78.1; 193/25 E, 25 C

[56] References Cited

U.S. PATENT DOCUMENTS

| 2,975,807 | 3/1961 | Waninger | 191/12 C |
| 3,053,358 | 9/1962 | Gross | 248/68 R |
| 3,197,954 | 8/1965 | Merker et al. | 191/12 C |
| 3,521,843 | 7/1970 | Ogle | 248/68 R |
| 4,232,845 | 11/1980 | Turner | 248/49 |

Primary Examiner—William H. Schultz
Assistant Examiner—Ramon O. Ramirez
Attorney, Agent, or Firm—D. Paul Weaver

[57] ABSTRACT

This invention relates to a cable mounting ladder including a plurality of transverse rungs which interconnect a pair of opposed side flanges or side runners, with the side flanges being severed, or partially severed, so that the ladder can be formed into an arcuate or curved shape.

2 Claims, 5 Drawing Figures

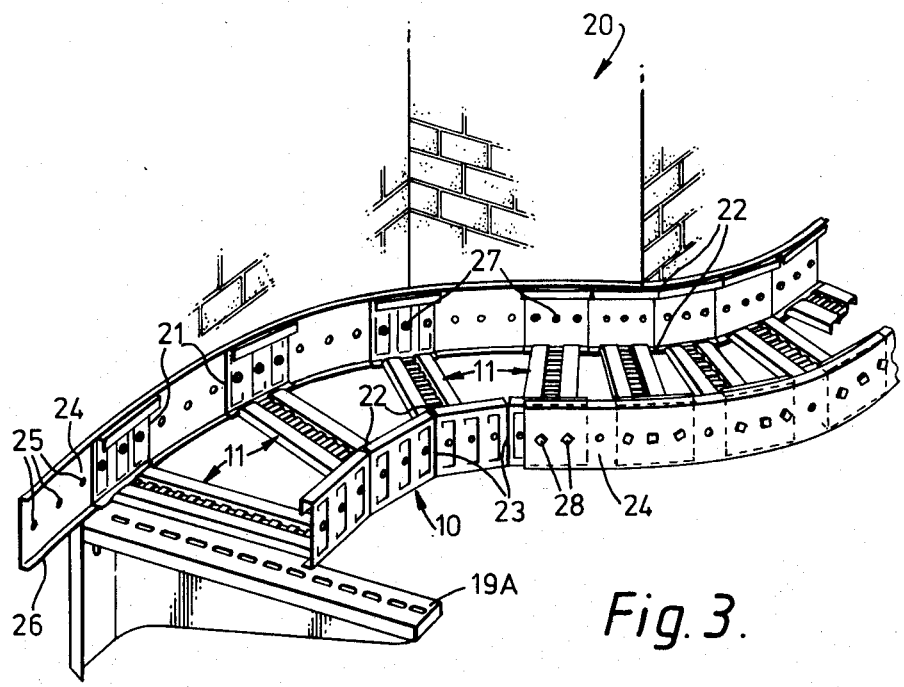
Fig. 3.
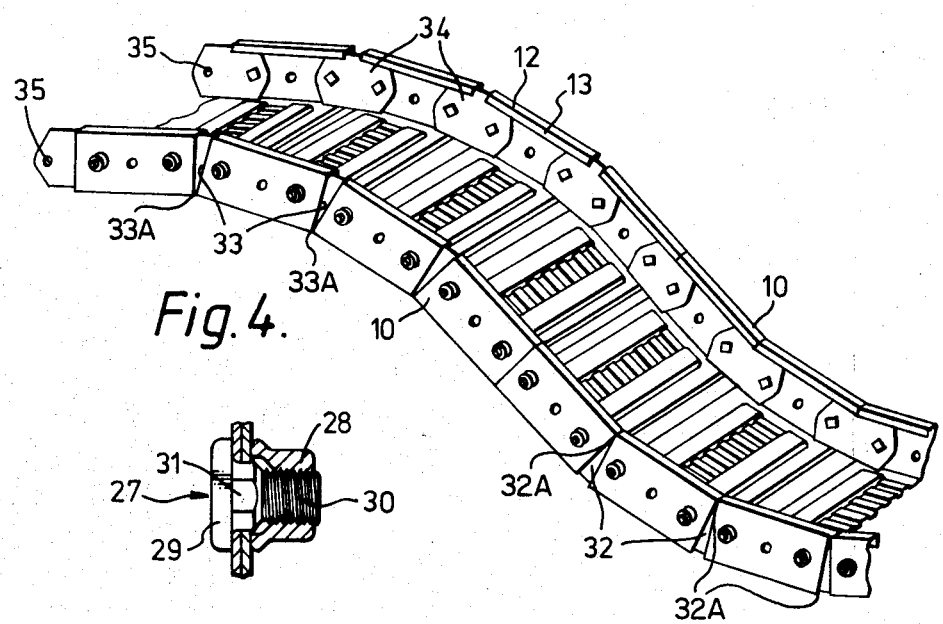
Fig. 4.
Fig. 5.

MEANS FOR MOUNTING CABLES AND THE LIKE

BACKGROUND OF THE INVENTION (1) Field of the Invention

This invention relates to improvements in means for mounting cables and the like.

(2) Description of the Prior Art

It is known to provide cable ladders for attachment to a wall or other part of a building and having side runners interconnected by transverse members or rungs for the attachment of electric cables or the like carried through the unit.

However, in conventional cable mounting ladders it was necessary to make custom made angled or shaped members which interconnected adjacent sections of cable mounting ladder so as to avoid obstructions and also to make custom made riser members or dropper members which were bolted to adjacent cable mounting ladder sections which were located in different horizontal levels or planes. Such procedures were time consuming and expensive, and increased installation time. In installation of conventional mounting ladders it was also necessary to drill holes in the cable mounting ladder at precisely measured locations which were dependent on the particular installation job involved.

BRIEF SUMMARY OF THE INVENTION

Accordingly, the invention in one aspect provides a method of installation of a cable mounting ladder to a building or other suitable structure, said cable mounting ladder including a plurality of transverse rungs which interconnect a pair of opposed side flanges or side runners, said method including the steps of:

(1) cutting a continuous length of cable mounting ladder into predetermined lengths or sections;

(2) attaching each section to an adjacent supporting structure;

(3) attaching a curved section of cable mounting ladder to one or more adjacent straight sections of cable mounting ladder to avoid obstructions in a horizontal plane or to extend vertically or downwardly from one horizontal plane to another.

The invention in another aspect provides a cable mounting ladder for use in the above described method, including a plurality of transverse rungs which interconnect a pair of opposed side flanges.

Preferably at least one of the side flanges is provided with divisions or cuts such that the ladder may be deformed or shaped to form a curve in a lateral direction to avoid an obstruction in a horizontal plane. Means may be provided such as a deformable strip to interconnect the divided sections of side flange. Alternatively both runners may be provided with divisions or cuts such that the ladder may be deformed or shaped to a curve which may extend upwardly or downwardly and means being provided for retaining both flanges in their curved form such as rigid link plates being interposed between adjacent sections of side flanges thus forming a plurality of hinged portions.

BRIEF DESCRIPTION OF THE DRAWINGS

In order that a preferred embodiment of the invention may be readily understood and carried into practical effect, reference is now made to the accompanying drawings, wherein:

FIG. 3 is a perspective view of part of a cable mounting ladder according to the invention mounted with its rungs in a horizontal plane and shaped to a double lateral curve to pass around an obstacle;

FIG. 4 is a perspective view of a ladder according to the invention shaped to rise from one level to another; and FIG. 5 is a partly sectioned nut and bolt assembly used in securing parts of a ladder according to the invention in a curved condition.

DETAILED DESCRIPTION OF THE PREFERRED EMBODIMENT

Figure 1:
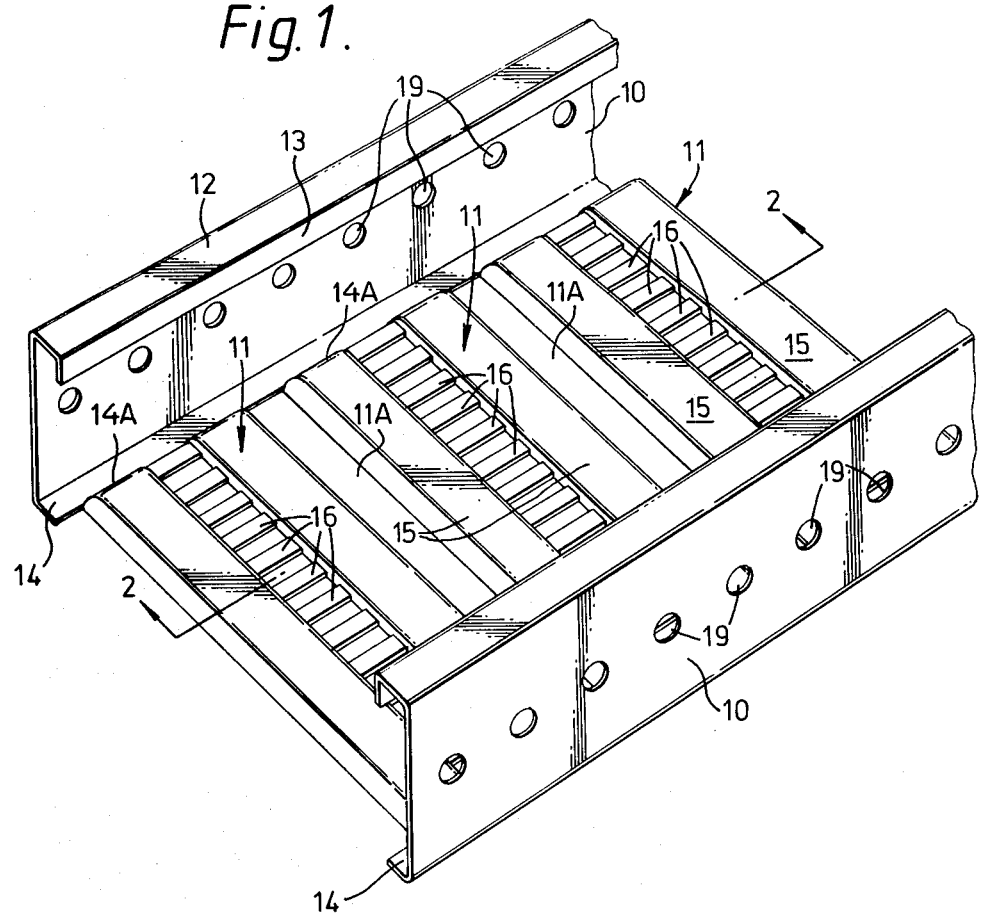
FIG. 1 is a perspective view of part of a cable mounting ladder according to the invention.

The cable mounting ladder shown in the drawings is formed integrally of a single piece of sheet metal cut and shaped to form two parallel side runners or flanges 10 interconnected by a series of similar equally spaced transverse rungs 11.

Each of the side runners has two right-angle bends along one longitudinal edge portion, which is uppermost in the drawings, to form a reinforcing web 12 and flange 13, and along the two longitudinal edge portions it has a right angle bend to form a base flange 14.

Figure 2:
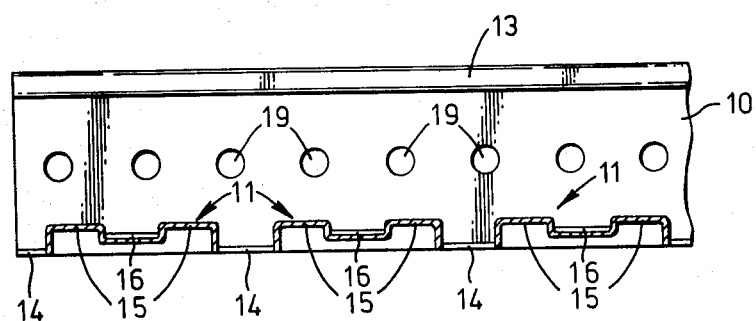
FIG. 2 is a longitudinal sectional view along line 2—2 in FIG. 1.

Each of the rungs 11 is formed integrally with the base flanges 14 of the two side runners 10, and is in the form of two spaced parallel transverse inverted channels 15 interconnected by a series of spaced parallel or longitudinal ribs 16 perpendicular to the channels 15 and parallel to the side runners 10. As shown particularly in FIG. 2, the outer flanges of the two channels 15 of each rung 11 are of considerably greater depth than the inner flanges of these channels, which are connected by the spaced ribs 16, so that the ribs 16 are spaced well above the base flanges 14 of the side runners 10, the top surfaces of the channels 15 of the rung being still further above the base flanges 14. There are also provided transverse slots 11A and curved webs 14A as shown in FIG. 1.

A series of equally spaced holes 19 for attachment of the ladder to a wall or other support structure are formed through both side runners 10. When it is required to join two similar cable mounting ladders side by side, this may be done by inserting attachment bolts through co-aligned holes 19 of adjacent runners 10 of each respective cable mounting ladder. If one ladder has to be shortened by cutting, simple fish plates may be used where required to join two ladder sections end to end.

The cable mounting ladder, as described, may be mounted in any suitable way, for example on cantilever support brackets as indicated at 19A in FIG. 3 and will be found very effective for straight runs of cables, which may be easily secured within the ladder by cable clips or clamps of multiple design engaged with the rungs, or may be easily tied to the rungs in desired arrangement, the spaced strips 16 facilitating this. The formation of the rungs is such that they will be very strong, and also will permit free circulation of air to prevent overheating of the cables. Sections of the ladder may be connected together end to end by fish plates bolted to the side runners of succeeding ladder sections.

It is frequently found that the route to be followed by the cables requires obstructions to be negotiated. FIG. 3 shows such an obstruction at 20, the side runners 10 being formed with divisions to enable the ladder to be deformed to a double lateral curve to clear the obstruction. The divisions consist of cuts or slots 21 through one or other of the side runners, between succeeding rungs 11, and correspondingly located cuts or slots 22 through the reinforcing web 12, flange 13 and base flange 14 of the opposite side runner 10, which is bent, as indicated at 23, between the top and bottom cuts 22, in shaping the ladder to the required configuration. Alternatively in some applications cuts 22 may be omitted and the side runner 10 simply bent in the required configuration. To secure together the side runner sections separated by the cuts 21, fairly readily deformable strips 24, each with a series of apertures 25, are provided, each of these strips being bent over at top and bottom to form narrow stiffening flanges 26. The deformable strips 24 are shaped to fit to the side runners 10 which are on the outside of the curves of the ladder, and are secured by bolts 27 passed through apertures 18 of the side runners and through appropriate registering apertures 25 of the strips 24, the bolts then being engaged by nuts 28. As shown in FIG. 5, each bolt 27 has a large head 29 and a shank 30 which, near to the head, is slightly coned and formed with opposite flats 31, the shank beyond this part being of reduced diameter and threaded. The apertures 18 of the side runners have flat sides with which the bolt flats 31 engage, to facilitate the tightening of the nut 28, which is of flanged type.

The ladder shown in FIG. 4 is deformed to rise from one level to another, and for this purpose both of the side runners 10 are formed with channel shaped slots 32 having an upwardly located vertex, each through the main or outside part of the runner and also through the base flange 14; and also, for a curve in opposite direction, with channel shaped slots 33 having a downwardly located vertex, each through the main or outside part of the runner and also through the reinforcing web 12 and flange 13. To hold the side runners to the curves to which they have been shaped, fish plates or other rigid connection members 34 are used being bolted to the inside faces of the side runners. The bolt holes 35 of the fish plates may be slotted to permit variations to the curvature of the ladder. Also shown are cuts 32A, 33A between webs 12 and flange 13 and base flange 14, respectively, providing for completely severed cable mounting ladder sections.

The various cuts or slots in the side runners may be made to suit the particular requirements a ladder is to meet; or alternatively the runners may be formed with weakened lines, between succeeding rungs 11, capable of being easily severed, to the extent required, at the site of installation.

I claim:

1. A cable mounting ladder including a plurality of transverse rungs interconnecting a pair of opposed side flanges or side runners which is of arcuate or curved shape wherein each side flange is severed or partially severed to form a multiplicity of severed or partially severed cable mounting ladder sections interconnected by a continuous resiliently deformable strip between adjacent side flanges of a respective side or each side of said cable mounting ladder.

2. A cable mounting ladder as claimed in claim 1 wherein said resiliently deformable strip includes a plurality of spaced attachment apertures and said side flanges include a multiplicity of spaced attachment apertures whereby a respective attachment aperture of said strip is aligned with a corresponding attachment aperture of an adjacent side flange and attached thereto by a fastening member.

* * * * *